W. M. UNDERHILL.
HOLDER FOR COWS' TAILS.
APPLICATION FILED JUNE 3, 1911.

1,044,302.

Patented Nov. 12, 1912.

WITNESSES
Edward Thorpe
Wm F. Nickel

INVENTOR
William M. Underhill
BY
ATTORNEYS

COLUMBIA PLANOGRAPH CO., WASHINGTON, D. C.

UNITED STATES PATENT OFFICE.

WILLIAM M. UNDERHILL, OF OCONTO, WISCONSIN.

HOLDER FOR COWS' TAILS.

1,044,302.　　　　Specification of Letters Patent.　　Patented Nov. 12, 1912.

Application filed June 3, 1911. Serial No. 631,040.

*To all whom it may concern:*

Be it known that I, WILLIAM M. UNDERHILL, a citizen of the United States, and a resident of Oconto, in the county of Oconto and State of Wisconsin, have invented a new and Improved Holder for Cows' Tails, of which the following is a full, clear, and exact description.

My invention is an improved holder for cows' tails, so constructed that when the cow lies down or leaves her stall her tail is released from confinement, and that it will permit the animal to switch her tail from side to side as much as she pleases, while at the same time holding the tail in suspended position away from the head of the milker, with the result that neither the cow nor the person milking is disturbed.

Heretofore it has been customary to fasten the cow's tail to the stall or some surrounding object, or fasten it to the cow's legs. In the first case it has been found that the milker is too apt to forget to unfasten the tail after milking, and it has often happened that the end of the cow's tail or switch has been pulled off in consequence. In the second case, fastening the cow's tail to her legs has often made the animal uncomfortable and restless, with the result that she has resorted to kicking, thus interfering with the operation of milking, and often subjecting the animal to injury by her lying down on the holder and cutting her udder and legs.

With my improved holder the above objections are entirely overcome. The holder being loosely suspended from overhead, the cow is still free to move her tail, and by reason of the fact that the tail cannot be switched from side to side below a certain plane, all inconvenience and annoyance to the milker is obviated.

Reference is to be had to the accompanying drawings forming a part of this specification, in which the same characters of reference indicate the same parts in all the views.

Figure 1:
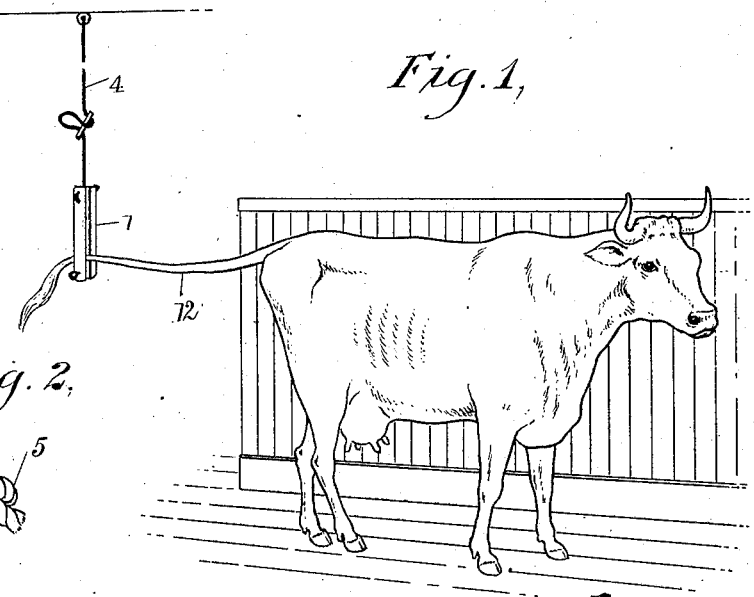
Figure 2:
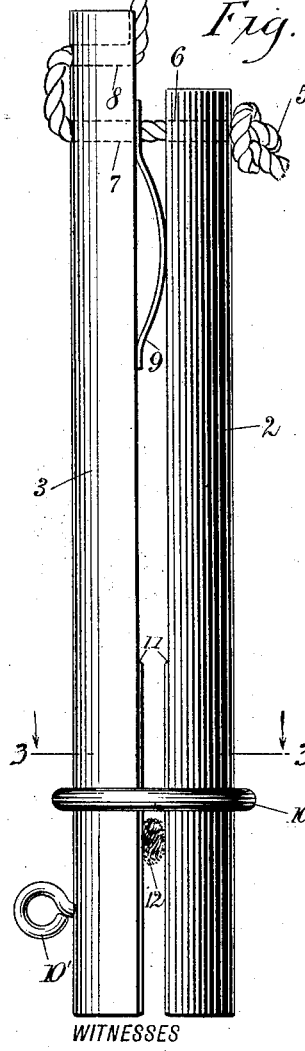
Figure 3:
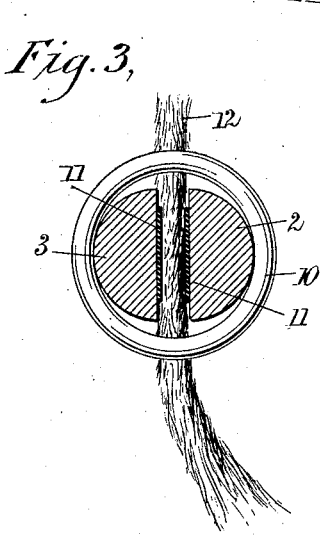
Figure 5:
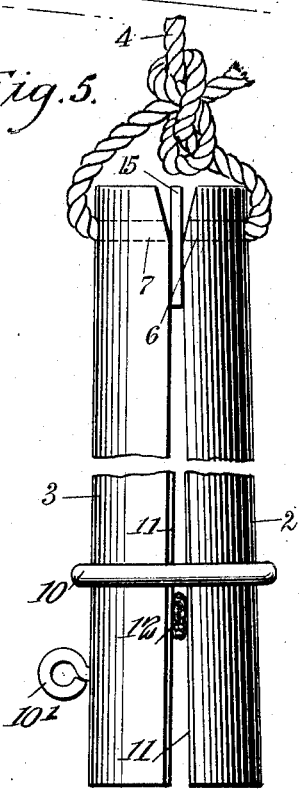
Figure 4:
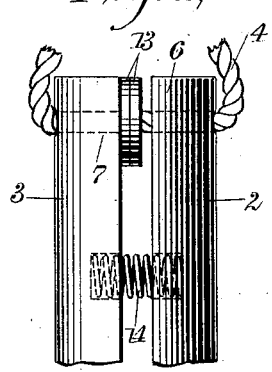

Figure 1 is a view, in perspective, showing my improved holder in position; Fig. 2 is a front elevation of the holder; Fig. 3 is a transverse horizontal section on the line 3—3 of Fig. 2; Fig. 4 is a front view of the upper end of a modified form; and Fig. 5 is a view of a third modification.

My improved holder 1 comprises a pair of tail gripping members in the form of parallel bars 2 and 3, suspended by means of a rope 4, from the ceiling or rafter of the barn or some point overhead, this rope 4 having a knot 5 in its lower end and passing horizontally through alined apertures 6 and 7 in the top of the bars 2 and 3, and then passing in a reverse direction through an aperture 8, parallel with and above the aperture 7 in the bar 3. This rope may be as long or short as desired.

In the form shown on Fig. 2, the bars 2 and 3 are kept apart by means of a flat spring 9 placed between them and fastened to one of the bars or suspended on the rope adjacent the upper end of the holder; and 10 is a ring surrounding the bars, this ring acting as a clamp to hold the bars together and support the tail on the left side of the cow, or as shown if preferred. An eyelet or stop of any kind, shown at 10', keeps this ring from slipping off the holder 1 entirely. On the opposed faces of the bars 2 and 3, adjacent their lower ends, is placed a pair of strips 11, these strips serving to line the inner faces of the bar 2 at the points where they grip the tail of the cow; and they may be made of rubber or any other suitable material.

When it is desired to use the holder, the same is suspended at a suitable point below the ceiling, and the ring 10 pushed up near the top. The outer end of the cow's tail is placed between the bars 2 and 3 near the ends thereof, so that the tail of the animal will be engaged by the lining strips 11. The ring 10 is then released and allowed to slide down the bars 2 and 3, forcing them together and causing them to act as jaws which grip the outer end or switch of the cow's tail just tightly enough to hold the tail up. The animal can now freely move her tail from side to side, and at the same time, on account of the suspended position of the member, it cannot annoy the milker.

In the form shown on Fig. 4, the bars 2 and 3 have apertures 6 and 7 at their upper ends to receive the suspending rope 4, and between the upper ends and mounted on the rope 4 is one or more washers 13. 14 is a spiral spring below the washers, which normally keeps the bars 2 and 3 distended. A ring similar to the ring 10 on Figs. 2 and 3, will be used in this form also.

On Fig. 5 the washers 13 are replaced by a spacing piece or pieces 15 of rubber, leather, or any other suitable material. In this form will also be provided the clamping ring, as well as the lining strips adjacent its lower ends.

It will be noted that in the modification shown in Fig. 5, the bars 2 and 3 have their opposed surfaces beveled off at their upper ends, as indicated by the numerals 2' and 3', respectively. The spacing means 15 is located adjacent these beveled portions; and the intersection of the beveled surfaces with the opposed surfaces of the bars 2 and 3 forms in effect a fulcrum for each of the bars, around which the bars tend to rotate, owing to the upward pull of the rope or cord 4 against the outer ends of the apertures 6 and 7 through these bars. In other words, the upward reaction of the rope exerts a turning movement in opposite directions on the bars 2 and 3, around the intersection of the beveled portions with the opposed portions of these bars as pivots; and the lever arm of this turning moment is equal to the length of the passages 6 and 7. In consequence, the bars 2 and 3 will always tend to spread themselves apart slightly or diverge in a downward direction. This facilitates the operation of placing the cow's tail between the bars 2 and 3, after which these bars are held in gripping position by means of the ring 10, in the same way as described above in connection with the form shown in Fig. 2.

With all of the three forms of holder above described, the tail will be held only tightly enough to keep it suspended as the cow moves it from side to side. Should the cow lie down or be liberated from her stall, the tail will be pulled loose from the holder at once, so as to free the animal. Hence, with my improved holder the milker is entirely protected during the operation of milking, and there is no possibility that the animal will be inconvenienced or injured by the forgetfulness of the milker to free the tail after the operation of milking is finished.

It will be observed that the action of the rope or cord 4 on all three of the forms of the applicant's invention shown and described is to tend to spread the bars 2 and 3 apart. This is because the rope tends to draw the upper ends of the bars together. In the form shown in Fig. 2 the result is to tend to cause the bars 2 and 3 to rotate about the point of contact between the spring 9 and the bar 2 as a fulcrum. In the form shown in Fig. 2, the tendency of the rope is to cause the bars to rotate around the spring 14 as a fulcrum; and in the case of the form shown in Fig. 5 the action of the rope is to tend to make the bars 2 and 3 rotate around the line of intersection between the beveled portions at the upper ends of the bars and the flat inner surfaces of the bars in contact with the spacing piece 15, to spread the bars 2 and 3 apart. The bars 2 and 3 when suspended therefore move automatically into position to enable the cow's tail to be passed between them whenever the ring 10 is raised, and whenever the ring is lowered the tail is held fast.

Having thus described my invention, I claim as new and desire to secure by Letters Patent:

1. A cow's tail holder comprising a pair of gripping members having alined apertures in their upper ends, flexible means for suspending said members passing through said alined apertures, said members having opposed surfaces which are beveled off adjacent their upper ends, spacing means located between said members adjacent the intersection of each of said opposed surfaces with the beveled portion, whereby the action of said suspending means tends to spread the lower ends of said members apart, and means for engaging the said members to draw the same together to releasably grip the tail of a cow between them.

2. A cow's tail holder comprising a pair of gripping members having alined apertures in their upper ends, flexible means for suspending said members passing through said alined apertures, said members having opposed surfaces which are beveled off adjacent their upper ends and are designed to be spaced apart at their lower ends when in gripping position, spacing means located between said members adjacent the intersection of each of said opposed surfaces with the beveled portion, whereby the action of said suspending means tends to spread the lower ends of said members apart, and means for engaging the said members to draw the same together to releasably grip the tail of a cow between them.

3. In an improvement of the kind described, the combination of a pair of gripping members arranged side by side, means engaging one end of both of said members to retain the same in operative position, said means tending to draw said ends together, means located between said members and spaced from said ends and serving as a fulcrum to cause the opposite ends of said members to spread apart, and means for engaging both of said members to draw the opposite ends together into gripping position.

In testimony whereof I have signed my name to this specification in the presence of two subscribing witnesses.

WILLIAM M. UNDERHILL.

Witnesses:
  RICHARD L. HALL,
  C. M. HILL.

Copies of this patent may be obtained for five cents each, by addressing the "Commissioner of Patents, Washington, D. C."